United States Patent Office 2,824,859
Patented Feb. 25, 1958

2,824,859

PRODUCTION OF RESINS BY REACTION OF MALEIC ANHYDRIDE WITH STEAM-CRACKED FRACTIONS

Egi V. Fasce, Baton Rouge, La., assignor to Esso Research and Engineering Company, a corporation of Delaware No Drawing. Application March 18, 1953
Serial No. 343,266

3 Claims. (Cl. 260—78.5)

This invention is broadly concerned with the preparation of new resins and, more particularly, is concerned with the condensation of anhydrides with selected unsaturated hydrocarbon fractions to yield light colored, high melting, high quality resins together with the separation of concentrated hydrocarbon streams.

It is known that a number of chemical and petroleum processes result in the production of hydrocarbon mixtures containing varying quantities of olefins, both branched chain and straight chain, diolefins, aromatic hydrocarbons, and paraffins, as well as other minor constituents. Processes which give such mixtures include catalytic and thermal cracking of petroleum feeds, steam cracking operations, vapor phase cracking and UOP nonselective polymerization processes (see Petroleum Refiner (Process Handbook Edition), vol. 27: 124 (September 1948)).

Separation of the various components is very difficult and fine separations are frequently impossible. Therefore, any process affording efficient utilization and separation of such mixtures is highly desirable and valuable to the art.

There has now been discovered a method whereby mixtures of hydrocarbon materials containing olefins of branched and straight chain types, diolefins, cyclic olefins, and aromatics can be treated in a series of interrelated and coacting steps to produce a stream containing the comparatively valuable straight chain olefins, a stream containing the highly useful cyclic olefins and aromatic constituents, together with valuable, light colored, high melting resins utilizing the branched chain olefins and diolefins.

Thus, the invention is based on the fact that light colored resins, melting above 200° C. can be made by the condensation of maleic anhydride with olefin and diolefin containing streams. The entire process to make the resins and isolate the separate streams includes the urea extraction which substantially removes the normal olefins and paraffins in the extract and also includes a maleic anhydride condensation of the raffinate products to convert the branched chain olefins and diolefins into resins. The unreacted material from this condensation is an aromatic concentrate containing also the cyclic olefins which, if desired, can be further subjected to purification steps much as selective crystallization or solvent extraction. Another method of operation includes carrying out the maleic anhydride condensation on the total stream by which the branched chain olefins and diolefins are removed as the resin product followed by a urea treatment of the raffinate to separate the normal olefins and paraffins. The raffinate from the urea treating step would consist of relatively pure aromatics together with the cyclic olefins.

The general facts regarding urea extraction for separation between normal and branched chain olefins have been known. Under the proper reaction conditions urea will selectively combine with normal olefins and paraffins to the substantial exclusion of combination with hydrocarbons of other types. It is believed that the urea and the reacting hydrocarbons form loosely bound coordinated compounds of hydrocarbon with urea. The combination is usually referred to as complex formation. The extraction may be carried out simply by contacting the hydrocarbon mixture to be separated with the urea reactant. A solvent may be used, if desired, although it is not necessary. The solvent chosen should be one in which both the normal hydrocarbons to be segregated and the urea are soluble. Suitable solvents include the alcohols and the alcohol amines. Methanol has been found to be particularly suitable and convenient. Others include ethyl alcohol, the propyl alcohols, the butyl alcohols, the amyl alcohols, ethanol amine, propyl amine, and diethanol amine. The amount of solvent necessary need not completely dissolve the urea and hydrocarbon treated. There should be enough solvent, however, to maintain the urea and the hydrocarbons as a slurry.

To summarize the urea extraction process, a mixture is made of the urea with a mixture of hydrocarbons containing the normal aliphatic olefins and paraffins to be separated. These reactants are then passed to a reaction zone whereby the urea and normal olefin hydrocarbons present react to form solid addition compounds. These solid addition compounds may then be separated by a simple filtration, settling step, and they may then be decomposed by the application of heat, or water to release the normal olefins. If a solvent such as methanol is employed, a somewhat lower temperature may be required to separate the crystals.

The cuts or fractions used as starting feeds in this process may vary widely as to the composition. The fractions may boil from 200 to 600° F. or be any fraction selected therefrom. In general, the more desirable feeds are characterized by high olefin content, 50–80% consisting of 5–10% n-olefins, and the remainder 45–75% highly branched olefins as well as 5–10% n-paraffins and the remainder largely substituted benzenes and polycyclic aromatics plus small concentrations of diolefins and some cyclic olefins.

For instance, the urea treating of a $C_{10}$ to $C_{14}$ distillate cut from steam cracking operations resulted in extract yields of 5–12% by volume of olefin extracts containing 40–75% of substantially (80–90%) straight chain olefins, remainder n-paraffins. The raffinate products obtained, consisted largely of a mixture of highly branched olefins, aromatic components and cyclic olefins.

This raffinate is then subjected to condensation with maleic anhydride. A mole for mole ratio, with preferably a slight excess of the anhydride is desirable. The temperature at which the condensation reaction is carried out is not critical, any temperature in the range of about 75 to 400° F. being quite useful. The period of time required is likewise not critical, but will depend somewhat on the other conditions employed, particularly the temperature. Time and temperature should be adequate to permit substantially complete reaction of the branched chain olefins with the maleic anhydride. A solvent may be employed if desired although the use of one is not necessary. Good agitation should be provided during the condensation reaction. Under the suitable conditions, the branched chain olefins present in the naphtha react quite completely with the maleic anhydride to form a light colored resin having a melting point above 200° C. This resin is separated, for example, by filtration and the filtrate contains the concentrated aromatics which may later be separated, if desired.

Alternatively, the initial stream may be treated with maleic anhydride to form the resin from the branched chain constituents. This procedure has been found to yield from 25 to 50% resin product based on the hydrocarbon cut employed. The unreacted naphtha can then be subjected to a urea extraction, if desired, to separate normal olefins from aromatics and cyclic olefins.

The resins which are prepared by this new method can be used in coating compositions, for preparing floor tile, paints, varnishes, as extenders, and the like.

They can be used as such or they can be admixed with other materials such as other resins and polymeric materials, fillers, pigments, and the like in order to adapt them for other uses.

Additionally, these resins can be subjected to further reactions to change or modify their properties. For example, their properties can be altered by converting the anhydride to an acid chloride with a suitable agent such as thionyl chloride and the like. The acid chloride is then further reacted with an alcohol, such as an aliphatic alcohol having one up to ten or twelve carbon atoms, for example, isooctyl alcohol. The resin diacid chloride is thereby converted to the dioctyl ester.

Such derivatives find use as plasticizers, oil and grease modifiers and as chemical intermediates and reactants.

It is to be understood that the foregoing operations can be carried out either in a batch or continuous manner, the exact manner in which the operation is done being unimportant.

The invention will be described in greater detail by the following examples, although it is not intended to limit the invention thereto. All parts are by weight unless otherwise noted.

EXAMPLE 1

About 260 parts of the crude 305–355° F. cut from a steam cracked distillate cut, representing 12.7% of the product, was treated with 100 parts of maleic anhydride by refluxing, with agitation, at 300° F. for two hours. A vigorous reaction resulted with the appearance of a solid insoluble resinous product. A hydrocarbon layer, pale yellow in color and having an aromatic odor, was decanted from the solid resin. A net yield of 190 parts of crude resin bottoms which melts above 200° C. (400° F.) was obtained. This yield corresponds to 53% by weight of resin based on the combined charge or 34.5% by weight based on the hydrocarbon feed.

Saponification of the resin bottoms with 10% caustic resulted in a light brown solution, which upon acidification with hydrochloric acid precipitated out a bulky light colored precipitate. The dry precipitate represented a yield of 169 parts. The crude resin showed an acid number of 260.

EXAMPLE 2

About 177 parts of the crude 355–405° F. cut from a steam cracked distillate product (12.9% by weight) was employed in this condensation run. This feed contained a total of 73% olefin from bromine number determination. The feed was refluxed with 85 parts of maleic anhydride for two hours. The product at the end of the run was distilled at atmospheric pressure to take over-head the unreacted hydrocarbons and maleic anhydride. The distillate consisted of a total of 124 parts. The distillation bottoms represented a recovery of 137.5 parts of yellow brown solid resin and corresponds to a net yield of 53% by weight of the combined charge.

Extraction of the distillate with caustic to remove the unreacted maleic anhydride yielded 108.5 parts of a hydrocarbon layer, water white in color and improved aromatic odor. This corresponds to 68% of the feed. By difference, approximately 30% of the feed reacted to form the resin product.

EXAMPLE 3

Urea extraction studies were conducted on the crude heavy naphtha feed [1] and selected 50° F. cuts from 350° F. to 570° F. Distillation data which are summarized in Table I indicate that 85% of the product represents $C_9$–$C_{17}$ hydrocarbons, of which more than half or 63% represents $C_{10}$–$C_{13}$ hydrocarbons. Urea extraction data shown below in Table II indicate that yields of 6.7 wt. percent of olefin extract products, consisting of 49% of $C_{10}$–$C_{13}$ olefins and the remainder n-paraffins were obtained from the crude naphtha feed. The olefin constituents by infrared were shown to consist predominately of alpha-olefins. Further breakdown by extraction of the 350–400, 400–440, 440–498, and 498–564° F. cuts indicated yields of 9.8, 8.6, 7.9, and 4.0% of extract product of 40–49% alpha-olefin contents. The urea raffinate products, because of the high bromine numbers (60–85) and specific dispersion values of 166–174, consist largely of branched chain olefins and aromatic constituents.

Table I
DISTILLATION OF HEAVY NAPHTHA FEED

|  | Boiling Point, °F. | Weight, Percent | Bromine No. | Percent Total Olefins by Bromine No. |
|---|---|---|---|---|
| Charge | | 100 | 82 | |
| Cut #1 | up to 300 | 5.6 | 76 | 53 |
| Cut #2 | 300–350 | 6.1 | 77 | 67 |
| Cut #3 | 350–400 | 19.6 | 75 | 72 |
| Cut #4 | 400–440 | 27.8 | 59 | 62 |
| Cut #5 | 440–498 | 25.3 | 64 | 78 |
| Cut #6 | 498–564 | 6.9 | 84 | |
| Bottoms | | 8.7 | | |

Table II

|  | Crude Heavy Naphtha | Cut #3 | Cut #4 | Cut #5 | Cut #6 |
|---|---|---|---|---|---|
| Urea Extraction Feed: | | | | | |
| Vol. Percent | 100 | 19.6 | 27.8 | 16.0 | 9.3 |
| Boiling Range, °F. | 200–600 | 350–400 | 400–440 | 440–498 | 498–564 |
| Gravity, °API | 25.4 | 30.4 | 26.0 | 24.6 | 20.2 |
| Bromine No. | 82 | 75 | 59 | 64 | 84 |
| Specific Dispersion | 169 | 165 | 169 | 173 | 171 |
| Extract Product: | | | | | |
| Wt. Percent Feed | 6.7 | 9.8 | 8.6 | 7.9 | 4.0 |
| Gravity, °API | 52.9 | 54.9 | 55.7 | 55 | |
| Bromine No. | 47 | 48 | 38 | 39 | |
| Specific Dispersion | 107 | 113 | 110 | 113 | |
| Percent Olefins by Bromine No. | 49 | 46 ($C_{11}$) | 40 ($C_{12}$) | 41 ($C_{13}$) | |
| Raffinate Product: | | | | | |
| Wt. Percent Feed | 93.3 | 91.2 | 91.4 | 92.1 | 96.0 |
| Gravity, °API | 23.1 | 27.4 | 24.1 | 23.9 | |
| Bromine No. | 86 | 85 | 62 | 73 | |
| Specific Dispersion | 168 | 167 | 174 | 172 | |

A second stage urea extraction failed to give any substantial additional extract. This indicates that the single stage extraction process gives essentially complete extraction of n-paraffins and olefins.

To summarize, it is believed that the heavy naphtha feed is composed of 3.3% by weight of predominately ---
[1] Herein referred to and in subsequent references including Table I represents steam cracked distillate stream employed as feed to clay treating step for removal of diolefin constituents.

$C_{10}$–$C_{14}$ n-olefins, 3.4% of n-paraffins, 65–70% highly branched olefins and diolefins, and 23–28% aromatics. A urea extraction of this feed gives as the extract, an n-olefin-paraffin mixture containing from 40 to 50% of alpha-olefins and a raffinate consisting largely of branched chain olefins and aromatic constituents.

This type of raffinate reacts well with maleic anhydride to give a solid, high melting resin product and an unreacted distillate fraction consisting substantially of the aromatics and unreacted cyclic olefins.

EXAMPLE 4

Narrow boiling cuts (50° F.) on a distillate stream product were also urea extracted. Fifty gallons of this product was distilled in the 60 gallon still. The distillation data in Table III indicate that approximately 60% distills in the range of $C_9$–$C_{15}$ hydrocarbons. Urea extraction of the 305–355, 355–405, 405–455° F. cuts resulted in respective olefin extract yields of 5.9, 7.2 and 8.7% by weight. The corresponding olefin concentrations are 76, 60, nad 42% in the case of the respective $C_{10}$, $C_{11}$, and $C_{12}$ cuts. The remainder of the extract constituents were identified as n-paraffins. The olefin constituents are largely (95–99%) alpha-olefins with traces of aromatic hydrocarbons. The raffinate product comprises a mixture of largely (50–60%) branched chain olefins and diolefins and the remainder aromatic hydrocarbons. This feed, too, reacts well with maleic anhydride to give resins from the branched chain olefins and an unreacted fraction containing the aromatics.

EXAMPLE 5

Maleic anhydride condensation studies were carried out on a series of feeds. These included the following:
(1) Steam cracked distillate 355 to 405° F. cut.
(2) Raffinate product from urea extraction of the steam cracked distillate 355 to 405° F. cut.
(3) Crude heavy naphtha feed.
(4) Catalytic cracked 408 to 473° F. cut.
(5) $C_{12}$ polypropylene olefin cut.

The yields and properties of the respective resins and unreacted hydrocarbon products from the above feeds are summarized in Table IV below.

Table IV

| | Steam Cracked Distillate 355–405° F. Cut | Raffinate Product from Urea Extraction of Distillate 355–405° F. Cut | Heavy Naphtha Feed | Catalytic Cracked Naphtha 408–473° F. Cut | $C_{12}$ Polypropylene Cut |
|---|---|---|---|---|---|
| Feed: | | | | | |
| Yield, Wt. Percent Distillate | 12.7 | 12.0 | 100 | | 100. |
| Gravity, °API | 28 | 24.4 | 25.4 | 31.3 | 49.1. |
| Bromine No. | 75 | 69 | 82 | 39 | 127. |
| Percent Olefins | 73($C_{11}$) | 66($C_{11}$) | | 45($C_{12}$–$C_{13}$) | |
| Specific Dispersion | 182 | 181 | 169 | | |
| Maleic Anhydride Resin: | | | | | |
| Yield, Wt. Percent Hydrocarbon Feed | 78 | 62 | 45.5 | 18 | 22.6. |
| Resin | Lt. Brown Solid Resin. | Lt. Brown Solid Resin. | Pale Yellow Solid Resin. | Very Viscous Brown Resin. | Clear Lt. Brown Viscous Polymer. |
| Unreacted Hydrocarbon: | | | | | |
| Yield, Wt. Percent Hydrocarbon Feed | 61.5 | 63 | 72.5 | 82 | 83. |
| Gravity, °API | 31.8 | 26.7 | | | 48.9. |
| Bromine No. | 41 | 46 | | | 133. |
| Percent Olefins | 40($C_{11}$) | 44($C_{11}$) | | | |
| Specific Dispersion | 161 | 181 | | | |
| Percent Aromatics (by M. S.) | | 41 | | 14 | 4. |

EXAMPLE 6

In order to alter and improve the properties of these resin products, an esterification was carried out with iso-octyl alcohol for the purpose of preparing the di-octyl ester. The crude resin product, the preparation of which is outlined in Table IV, column 2 above, was employed in the esterification reaction. Thirty-eight parts of the crude solid resin together with about 200 parts of carbon tetrachloride solvent were placed in a reactor equipped with a stirrer and a reflux condenser. To the mixture, agitated at 150–170° F., was added over a one-hour period, 35 parts of thionyl chloride or a slight excess to form the desired diacid chloride. The mixture was refluxed for an additional one-half hour. The mixture was distilled until no further odor of thionyl chloride was present in the overhead distillate.

Table III
DISTILLATION OF STEAM CRACKED DISTILLATE

| | Boiling Point, °F. | Wt. Percent Charge | Gravity, °API | Bromine No. | Wt. Percent Olefins | Specific Dispersion |
|---|---|---|---|---|---|---|
| Charge | | | 32 | 74 | | 185 |
| Cut #1 | up to 55 | | | | | |
| Cut #2 | 55–80 | 2.8 | | | | |
| Cut #3 | 80–105 | | 75 | 236 | | 173 |
| Cut #4 | 105–130 | | | | | |
| Cut #5 | 130–155 | 0.9 | | | | |
| Cut #6 | 155–180 | 2.8 | | | | |
| Cut #7 | 180–205 | 4.3 | | | | |
| Cut #8 | 205–230 | 7.6 | | | | |
| Cut #9 | 230–255 | 7.5 | | | | |
| Cut #10 | 255–305 | 15.0 | | | | |
| Cut #11 | 305–355 | 12.7 | 32.3 | 75 | 66 ($C_{10}$) | 176 |
| Cut #12 | 355–405 | 12.9 | 28.0 | 76 | 73 ($C_{11}$) | 182 |
| Cut #13 | 405–455 | 16.9 | 24.8 | 54 | 57 ($C_{12}$) | 188 |
| Bottoms | 455+ | 16.6 | 12.1 | 47 | | 173 |

The residue in the flask was then esterified by adding 0.5 mole of iso-octyl alcohol. The addition of the alcohol was made over a one-hour period. Refluxing was continued for an additional hour. The reaction mixture, upon cooling, was filtered to separate off the solid material by-product.

The filtrate product was distilled to remove the final traces of solvent and unreacted alcohol, first, by distillation to 300° F. at atmospheric pressure and finally, to 2 to 3 millimeters at maximum bottoms temperature of 370° F. A net yield of 48 parts of viscous brown liquid ester product representing 126% by weight of the resin feed was obtained. The ester product showed the following properties:

| | |
|---|---|
| Saponification No | 214 |
| Hydroxyl OH No | 1 |
| Acid No | 1 |
| Iodine No | 29 |

From the above inspections, it is clear that the product is quite saturated and essentially an ester.

Experiments in plasticizing were carried out on samples of the ester product in which blends of 50% of the ester resin product was compatible with vinyl resin and gave a tough plastic that did not blush when bent. These tests show that the di-octyl resin product can be used as a plasticizing agent.

What is claimed is:

1. A separation process which comprises extracting normal aliphatic olefins and paraffins contained in a steam-cracked petroleum fraction boiling between about 200° and 600° F. with urea and removing therefrom the resulting solid extract to obtain a raffinate containing diolefins, branched-chain olefins, aromatic hydrocarbons and cyclic olefins; condensing the branched-chain olefins and diolefins contained in said raffinate with maleic anhydride at a temperature of at least 75° F. and removing therefrom the resulting condensate, and recovering the remaining aromatic hydrocarbons and cyclic olefins.

2. A process according to claim 1 wherein said urea is added in solution with a solvent in which both said urea and said aliphatic olefins and paraffins are soluble.

3. A separation process which comprises first contacting a $C_{10}$ to $C_{14}$ steam-cracking distillate fraction with urea in an extraction zone, separating a hydrocarbon raffinate containing diolefins, branched-chain olefins, aromatic hydrocarbons and cyclic olefins from the resulting addition compounds of the normal olefins and paraffins combined with the urea, and decomposing said addition compounds to release said normal olefins and paraffins; then contacting the raffinate, containing a substantial proportion of branched-chain olefins and diolefins, with maleic anhydride in a condensation reaction zone at a temperature in the range of about 75° to 400° F., separating therefrom the resulting light colored branched-chain resin having a melting point above 200° C.; lastly, recovering the remaining portion of said raffinate fraction consisting essentially of aromatic hydrocarbons and cyclic olefins not removed by the prior extraction and condensation steps for purifying by conventional purification means.

References Cited in the file of this patent

UNITED STATES PATENTS

| | | |
|---|---|---|
| 2,055,456 | Eichwald | Sept. 22, 1936 |
| 2,133,734 | Moser | Oct. 18, 1938 |
| 2,142,980 | Huijser et al. | Jan. 3, 1939 |
| 2,378,629 | Hanford | June 19, 1945 |
| 2,518,677 | Garner et al. | Aug. 15, 1950 |
| 2,520,715 | Fetterly | Aug. 29, 1950 |
| 2,527,081 | Ross et al. | Oct. 24, 1950 |
| 2,615,845 | Lippincott et al. | Oct. 28, 1952 |

OTHER REFERENCES

Heilbron, "Dictionary of Organic Compounds," page 865, item "2,4,4-trimethyl 1-pentene," Oxford University Press, New York (1943).